United States Patent [19]

Smyth

[11] Patent Number: 4,554,123

[45] Date of Patent: Nov. 19, 1985

[54] PROCESS AND APPARATUS FOR DIRECT EXTRUSION OF THERMAL BARRIER PROFILES

[75] Inventor: Laurence C. Smyth, Beaconsfield, Canada

[73] Assignee: Norandex Inc., Cleveland, Ohio

[21] Appl. No.: 609,110

[22] Filed: May 10, 1984

[51] Int. Cl.$^4$ .............................. B29F 3/10; E04B 1/62
[52] U.S. Cl. .................................. 264/166; 29/155 R; 29/418; 264/171; 264/177 R; 264/261; 425/113; 425/114; 425/122
[58] Field of Search ............. 264/174, 177 R, 171, 264/261, 166; 425/113, 114, 122; 29/155 R, 418

[56] References Cited

U.S. PATENT DOCUMENTS

| | | | |
|---|---|---|---|
| 3,088,166 | 5/1963 | Colombo ........................... | 264/177 R |
| 3,148,431 | 9/1964 | Berliner ............................. | 425/114 |
| 3,204,324 | 9/1965 | Nilsen ............................... | 29/155 R |
| 3,393,487 | 7/1968 | Nolan ................................ | 52/403 |
| 3,424,836 | 1/1969 | McKelvey et al. ................. | 264/174 |
| 3,624,885 | 12/1971 | Holliday et al. .................... | 29/200 |
| 3,813,199 | 5/1974 | Friesner ............................. | 425/113 |
| 3,818,666 | 6/1974 | Winans .............................. | 52/403 |
| 3,823,524 | 7/1974 | Weinstein .......................... | 52/729 |
| 3,865,914 | 2/1975 | Nahr .................................. | 264/261 |
| 4,051,209 | 9/1977 | Tabler ................................ | 264/261 |
| 4,093,499 | 6/1978 | Naka ................................. | 425/113 |
| 4,185,439 | 1/1980 | Bischlipp et al. .................. | 264/261 |

FOREIGN PATENT DOCUMENTS

| | | | |
|---|---|---|---|
| 1084778 | 9/1980 | Canada. | |
| 2822713 | 11/1978 | Fed. Rep. of Germany ...... | 425/113 |
| 2431644 | 3/1980 | France ............................... | 264/177 R |
| 1599284 | 9/1981 | United Kingdom .............. | 264/177 R |

Primary Examiner—Jeffery Thurlow
Attorney, Agent, or Firm—Fleit, Jacobson, Cohn & Price

[57] ABSTRACT

A process and apparatus for direct extrusion of thermal barrier profiles is disclosed. The process comprises the steps of providing an elongated structural member having a lineal cavity therein with an open portion, driving the elongated member past a filling die while simultaneously guiding the elongated member so as to positively locate the open portion of the lineal cavity with respect to the filling die in order to completely close the cavity at the location of the filling die, continuously extruding thermoplastic along the cavity through a fluid flow passage in the filling die, and removing a lineal portion of the structural member opposite to the open portion of the lineal cavity to form the thermal barrier profile. The process may also be used to construct a composite thermal barrier profile by providing two separate elongated structural members having portions facing and spaced from each other to form a lineal cavity with opposite open portions, driving the elongated members past a filling die while simultaneously guiding the elongated members so as to positively locate the open portions of the lineal cavity with respect to corresponding portions of the filling die in order to completely close the cavity at the location of the filling die, and continuously extruding thermoplastic material along the cavity through a fluid flow passage in the filling die.

19 Claims, 19 Drawing Figures

PROCESS AND APPARATUS FOR DIRECT EXTRUSION OF THERMAL BARRIER PROFILES

This invention relates to a process and an apparatus for direct extrusion of thermal barrier profiles.

Metallic profiles, typically aluminum, are used extensively for architectural framing for curtain walls, doors, windows, etcetera. To reduce energy losses and condensation problems, virtually all metallic profiles, roll formed or extruded, use nonmetallic thermal barriers between an outer profile and an inner profile. This business, and in particular the window business, is large in volume and highly competitive. As such, although there are many thermal barrier patents, very few high volume production methods are widely used.

In North America, two basic high volume thermal barrier processes are used. The first process involves extrusion of three separate profiles, two aluminum and one thermoplastic which is typically rigid polyvinyl chloride (PVC). The three extrusions are formed with appropriate recesses so that they can be mechanically linked together to form a thermal barrier frame section. Relative motion between the profiles is prevented for structural purposes, if desired, usually by roll crimping the aluminum into the plastic barrier, although bonding and other schemes can also be used.

The second process developed and now the most predominantly used one for high volume is the poured thermal barrier process. In this method typically one large aluminum extrusion is used that has a generally U shaped cavity in the middle that is filled with a liquid plastic material, typically a liquid thermoset material, most commonly polyurethane (although molten free flowing thermoplastic materials such as hot melt adhesives are also disclosed in U.S. Pat. No. 3,393,487). After the liquid plastic material has solidified, usually bonding to the aluminum, the aluminum bottom of the U is removed, as by sawing (debridging), to yield the desired structural composite aluminum thermal barrier frame. This is the essence of U.S. Pat. No. 3,204,324. It is also possible to use two separate aluminum profiles with the poured process by appropriate jigging and sealing the cavity bottom to eliminate the debridging operation, as delineated in U.S. Pat. Nos. 3,393,487 and 3,818,666. In either case, fewer operations are required to produce the finished thermal barrier profile than in the first process.

In a very competitive market, the chief advantage of the first process is that a lower cost thermal barrier material can be used. Thermoplastic polyvinyl chloride is typically half the cost of thermoset polyurethane, on a volume basis. The major advantages of the second process are that first, material handling and work in process inventory is reduced. Secondly, as the thermal barrier bonds to the aluminum and, in the case of a single extrusion, as the aluminum bridge precisely spaces the ultimately separated two aluminum sections, precise and reproducible structurally sound thermal barrier cavities are simply produced. The objective of the present invention is to combine the advantageous properties of both processes, that is to combine lower cost thermoplastic extrusion with the material handling, ease and uniform quality of the poured process.

The process in accordance with the present invention comprises the steps of providing an elongated structural member having a lineal cavity therein with an open portion, driving the elongated member past a filling die while simultaneously guiding the elongated member so as to positively locate the open portion of the lineal cavity with respect to the filling die in order to completely close the cavity at the location of the filling die, continuously extruding thermoplastic along the cavity through a fluid flow passage in the filling die, and removing a lineal portion of the structural member opposite to the open portion of the lineal cavity to form the thermal barrier profile.

The width of the filling die is only slightly smaller than the width of the open portion of the lineal cavity to prevent back flow of the thermoplastic material between the filling die and the cavity wall.

The apparatus in accordance with the present invention comprises a filling die adapted to be inserted in the lineal cavity to close the open portion of the cavity, means for driving the elongated member past the filling die, guide means to positively locate the open portion of the lineal cavity with respect to the filling die, means for feeding thermoplastic material into the cavity through a fluid flow passage in the filling die, and means for removing a lineal portion of the structural member opposite the open portion of the lineal cavity to form the thermal barrier profile.

The means for driving the elongated member may be a driven toothed wheel engaging the bottom of the elongated structural member and a pinch roll engaging the top of the elongated structural member, or vice versa. The guide means may be a pair of rolls engaging opposite sides of the structural member, or a separate wheel engaging the open portion of the lineal cavity and having a width slightly less than the width of the open portion of the cavity.

The means for driving the elongated member is preferably a driven toothed wheel engaging the interior bottom of the lineal cavity through the open portion of the lineal cavity. The width of the toothed wheel is slightly less than the width of the open portion of the cavity to guide and locate the open portion of the cavity with respect to the filling die.

The filling die may include an additional die portion ahead of the fluid flow passage to block off the lineal cavity from forward fluid flow. The filling die may also include a streamlined portion to direct the flow of thermoplastic material in the same direction as the profile. The filling die may further include a raised back fin to force the thermoplastic material into the cavity.

The process in accordance with the invention may also be used to construct a composite thermal barrier profile by providing two separate elongated structural members having portions facing and spaced from each other to form a lineal cavity with opposite open portions, driving the elongated members past a filling die while simultaneously guiding the elongated members so as to positively locate the open portions of the lineal cavity with respect to corresponding portions of the filling die in order to completely close the cavity at the location of the filling die, and continuously extruding thermoplastic material along the cavity through a fluid flow passage in the filling die.

The apparatus for constructing a composite thermal barrier profile in accordance with the above process comprises a filling die adapted to be inserted between the two spaced portions of the structural members and having portions adapted to close the open portions of the lineal cavity, means for driving the elongated members past the filling die, guide means to positively locate the two open portions of the cavity with respect to the corresponding portions of the filling die, and means for feeding thermoplastic material in the cavity through a fluid flow passage in the filling die.

A second process for constructing a composite thermal barrier comprises clamping the two profile portions of the structural members to a solid spacer member so as to create an equivalent one piece elongated structural member having a lineal cavity with an open portion, which is then filled by the above first described process. The spacer member is then removed and no debridging is required.

The invention will now be disclosed, by way of example, with reference to the accompanying drawings in which.

Figure 1:
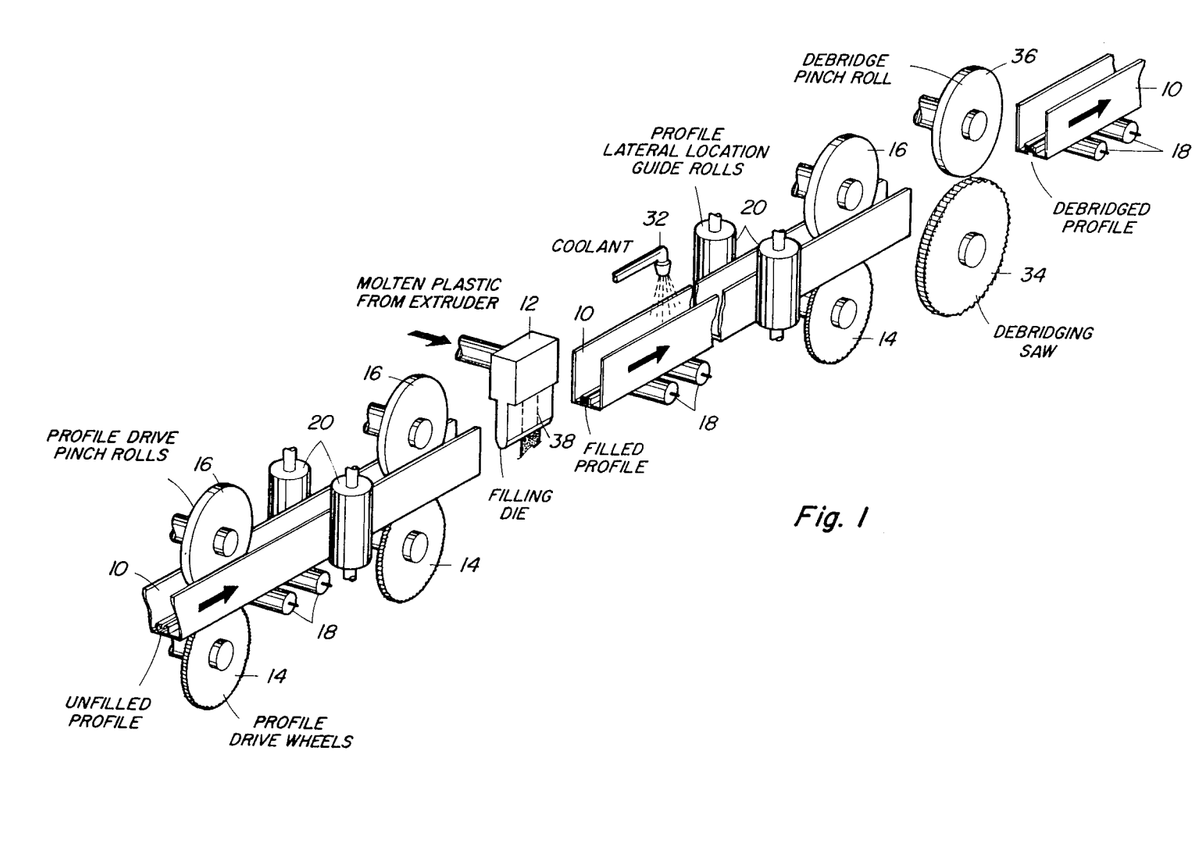
FIG. 1 is a schematic diagram of an apparatus for direct extrusion filling of a thermal barrier profile.

Referring to FIG. 1, there is shown a schematic diagram of an apparatus for driving a metallic profile 10 past a filling die 12 which is fed with molten thermoplastic material from an extruder (not shown). As it will be disclosed in more detail later on, the profile is driven by toothed wheels 14 which are pinched into the bottom of the profile by opposed preloaded pinch rolls 16. The profile is precisely located and guided with respect to the filling die by bottom rolls 18 and side rolls 20.

Figure 2:
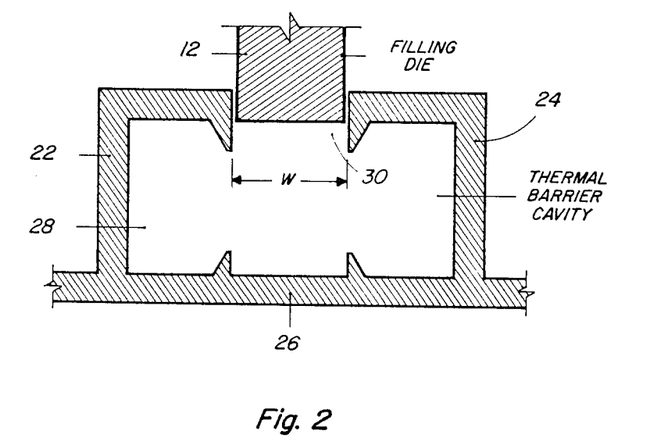
FIG. 2 is a cross section view of the profile as it passes through the filling die.

FIG. 2 is an enlarged cross section view of the profile 10 as it passes through the filling die 12. As it is seen more clearly in this Figure, the profile has a central portion formed by a C shaped channel 22 and a reversed C shaped channel 24. The two channels are united by a bridging portion 26 on one side but are spaced at the opposite side so as to form a lineal cavity 28 with an open portion 30. When the open portion 30 of the cavity is closed by the filling die 12, a totally enclosed cross-section similar to a mould is formed at the location of the filling die. By utilizing a stationary filling die and a moving profile, it is possible to continuously fill the cavity with thermoplastic materials which are highly viscous when molten. It will be noted that thermoplastic materials do not readily flow but require considerable pressure to force them to take a particular shape. As shown schematically in FIG. 1, the filled profile is then passed through a cooling station where it is sprayed with a suitable coolant by spray nozzle 32. The profile is subsequently fed by another set of toothed wheel 14/pinch roll 16, and guided by another set of bottom rolls 18/side rolls 20 to a debridging saw 34 which removes the bridging portion 26 of the profile (FIG. 2) so as to form the thermal barrier. Pinch rolls 36 are located above the saw to maintain pressure on the profile during the debridging operation. Although FIG. 1 shows on-line debridging of the profile, it is to be understood that the cavity filling and debridging operations may be done in two separate steps.

This process is particularly well suited to filling a generally lineal cavity formed in an extruded aluminum window profile with thermoplastic extrusion and moulding compounds such as rigid polyvinyl chloride (PVC), acrylonitrile butadiene styrene (ABS), high density polyethylene (H.D.P.E.), polypropylene (P.P.), impact polystyrene (F.S.), polyethylene terephthalate (PET), etcetera, as homopolymer, copolymer alloys, all as filled or unfilled, solid or foamed. However, it is to be understood that it can be used to fill any lineal cavity formed in any material such as metal, plastic or wood, by any process such as extrusion, roll forming, sawing, etc, with any viscous material.

Figure 3:
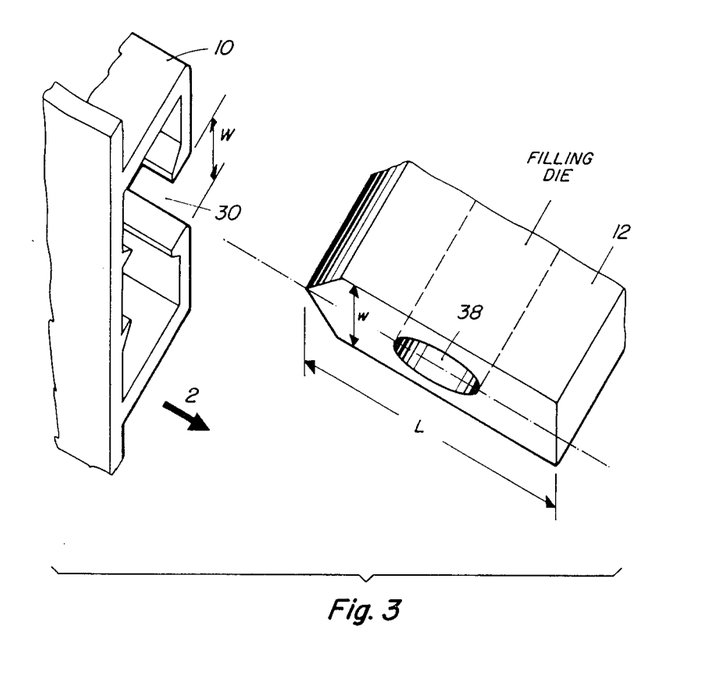
FIG. 3 is a bottom perspective view of the filling die.

FIG. 3 shows an enlarged partial perspective bottom view of the filling die 12 used to directly extrusion fill a thermal barrier cavity through a fluid flow passage 38 in the filling die. The physical parameters of the filling die have been carefully explored. It was found that a long filling die length L was not useful, except in the case of foam extrusion. A die length in the range of 1.75 to 3" was found to be adequate. This was not unexpected since plastic and metal extrusion dies are very short in length. The width of the die "w" in the thermal barrier cavity slot width "W" was also studied carefully. Depending on the melt characteristics of the plastic being extruded, it was found that, generally, at clearances greater than 0.005 inch back extrusion flow between the filling die and cavity wall occured, usually along with incomplete filling of the thermal barrier cavity. In the case of materials with significant molten shape memory, as typical of polyolefins, the clearances had to be much less, typically <0.002 inch, to develop sufficient pressure to force the plastic to take the complete cavity shape. It was been found that extruder pressure in a range of 1000–5000 psi was sufficient for extruding most thermoplastics although a large part of that pressure was used to overcome resistance due to the torturous flow path of the filling die. The size of the fluid flow passage is not critical but must be large enough to minimize extruder back pressure. The profile speed was typically in the range of 25–100 fpm.

Figure 4:
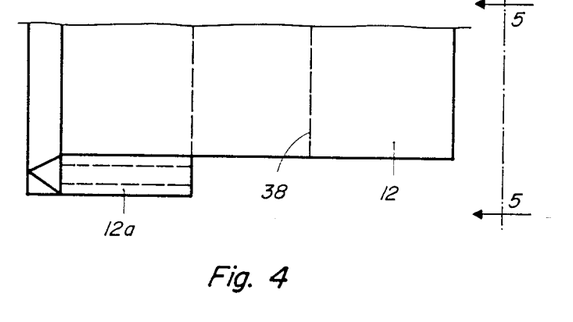
FIGS. 4–8 show filling die alternatives.
Figure 5:
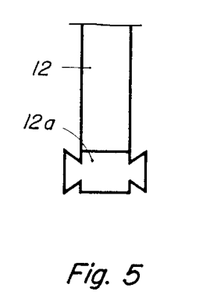

FIGS. 4 and 5 show a filling die in which an additional die portion 12a having the same cross-section as the cavity is provided ahead of the fluid flow passage 38 to block off the thermal barrier cavity from forward fluid flow to help in developing additional filling pressure if required.

Figure 6:
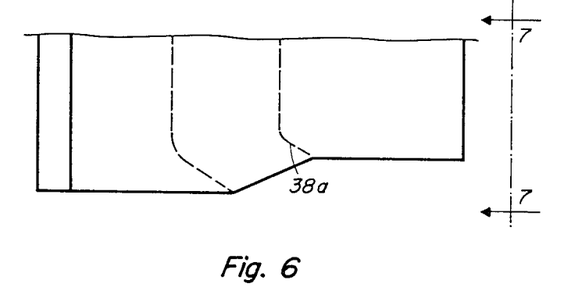
Figure 7:
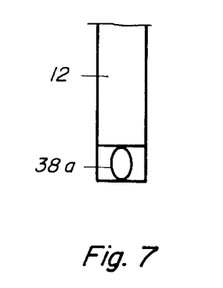

FIGS. 6 and 7 show a filling die alternative in which the direction of the fluid flow passage 38a is changed in the die in a streamlined fashion to reduce moulded-in stresses in the cavity.

Figure 8:
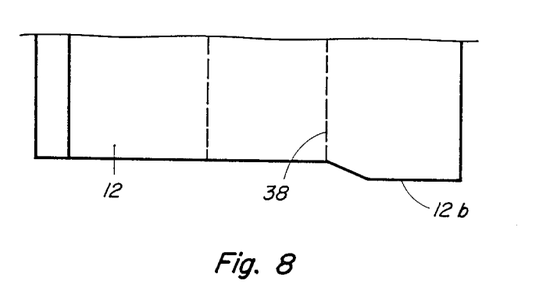

FIG. 8 shows a filling die alternative which includes a fin 12b to improve filling of the thermal barrier cavity by developing resistance to flow. In practice, the added fin ploughs the viscous fluid forcing it into the cavity before swelling up behind the fin.

Figure 9:
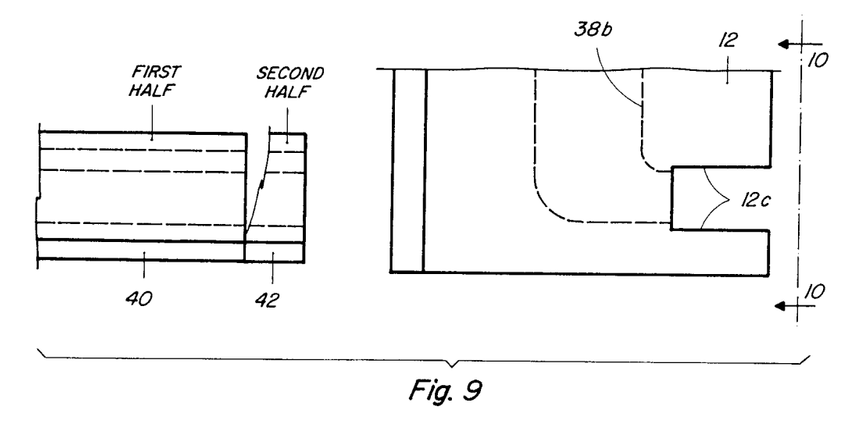
FIGS. 9 and 10 show another filling die alternative for filling and joining two separate thermal barrier half extrusions into a composite thermal barrier profile not requiring debridging.
Figure 10:
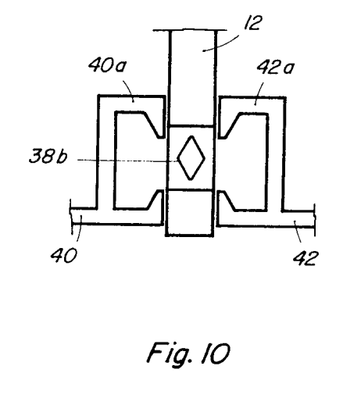

Although the disclosure of the invention has been so far associated with the filling of thermoplastic material in the lineal cavity of a single piece profile which is later debridged to form a thermal barrier, it may also be applied to the filling and joining of two separate thermal barrier half extrusions into a composite thermal barrier profile not requiring debridging. FIGS. 9 and 10 of the drawings show a side and an end view, respectively of two separate profiles 40 and 42 having C shaped portions 40a and 42a facing each other at a predetermined distance and forming a cavity having opposite open portions. Such profiles may be driven and guided past a filling die in a manner similar to the single piece profile except that it will require two parallel sets of feed wheels and guide rolls. FIGS. 9 and 10 of the drawings show an embodiment of a filling die which may be used for filling the two partial cavities and the space between the two profiles. The filling die extends across the full height of the profiles and has a slot at the exit end thereof forming portions 12c for closing the open portions of the cavity. The fluid flow passage 38b is directed into the slot.

Figure 11:
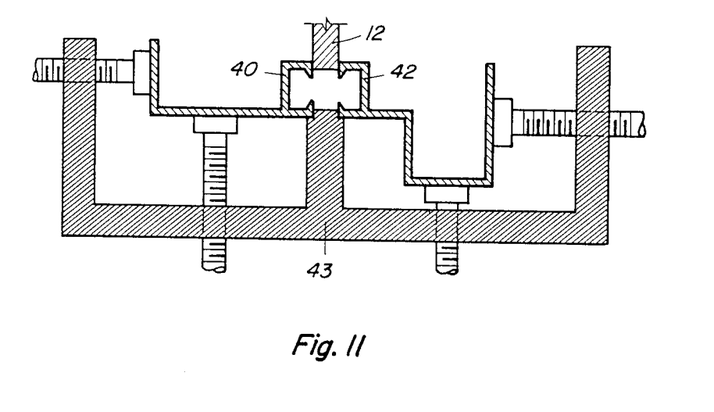
FIG. 11 shows an alternate method for filling and joining two separate thermal barrier half extrusions.

A second method of direct extrusion filling of a composite thermal barrier profile is also possible. FIG. 11 of the drawings illustrates a spacer and clamping jig 43 in which two separate profiles 40 and 42 are precisely located to close one open portion of the cavity. Filling die 12 closes off the other open portion of the cavity so that direct extrusion filling can take place.

Obvious in the above examples is the necessity to precisely locate the filling die with respect to the single or multiple partial cavity elements. Also, because of inaccuracies in the profiles, light rubbing of at least one side of the thermal barrier cavity against the filling die is typical. As such, a much more positive drive is required than in liquid polymer pouring since complete filling only occurs when the viscous material flow rate precisely matches the thermal barrier cavity volume flow rate.

Figure 12:
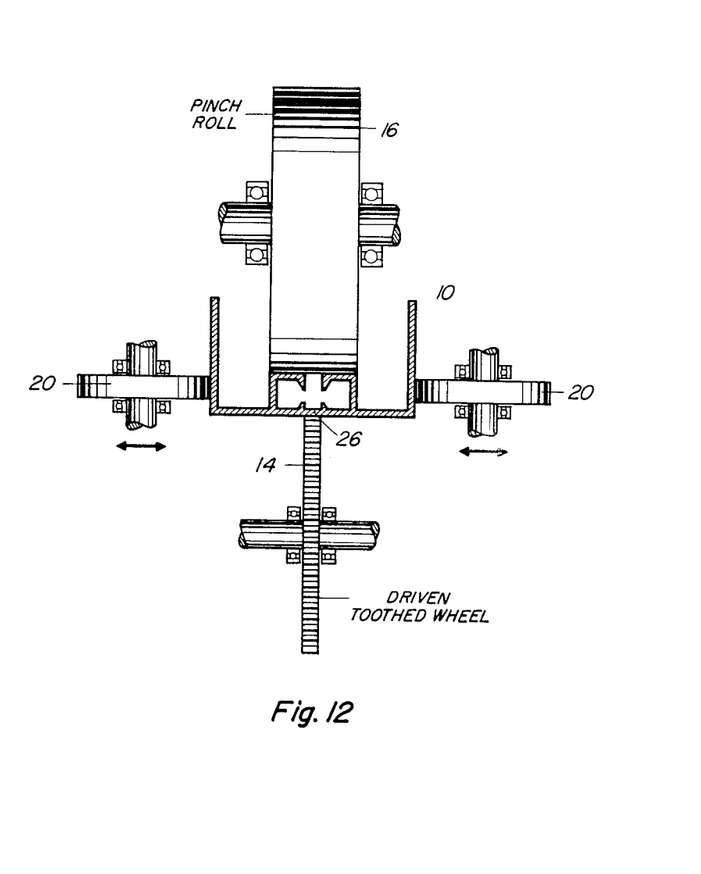
FIGS. 12 and 13 show means for precisely locating and driving a profile past a filling die.

Driving the profiles with elastomer covered rolls loaded against the profile side walls is industrially used and is described, for example, in U.S. Pat. No. 3,624,885, for pouring liquid thermal barrier. This method is neither sufficiently precise nor positive enough for the direct extrusion filling process. FIG. 12 illustrates the novel method developed for precisely locating and driving the profiles past a stationary extrusion filling die. Precisely adjustable side guide rolls 20, preferably elastomer covered to prevent profile marking, positively locate the thermal barrier cavity with respect to the filling die 12. A sharp-toothed drive wheel 14 is pinched into the thermal barrier cavity by an opposed preloaded pinch roll 16. This provides positive drive although the profile is marked by the toothed drive wheel. This potential problem is eliminated by driving the one piece thermal barrier cavity profile on the cavity bridge 26 which is subsequently removed, as by sawing, to remove any drive markings. Note that the toothed drive wheel/pinch roll pair can be used in the opposite sense illustrated, that is with the toothed drive wheel driving the interior side of the cavity bridge. This is especially beneficial when very high driving force is required as there is no bending moment applied to the thermal barrier cavity, as can be readily imagined in FIG. 12, by the necessary higher pinching force.

Figure 13:
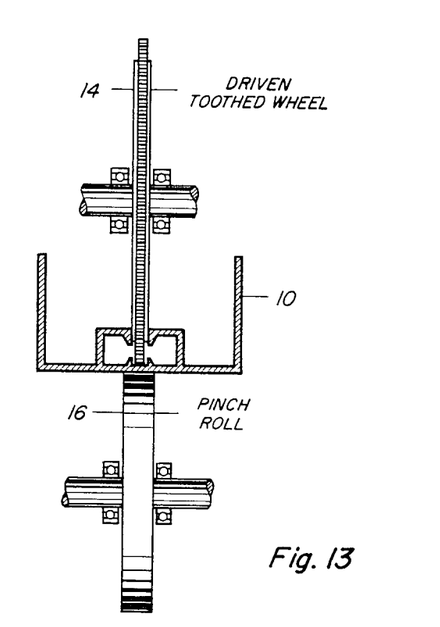

FIG. 13 illustrates a profile drive method similar to that of FIG. 12 which includes a most simple and precise profile positioning method. The pinch roll 16 is located underneath the profile and the toothed drive wheel engages the internal bottom of the cavity. This eliminates the requirement for removing drive markings. In addition, the width of the drive wheel is essentially the width of the thermal barrier cavity slot so as to eliminate the requirement for side guide rolls and provide a precise and positive drive method well suited to the direct extrusion filling process. Also, separate cavity width wheels can be used for profile guiding and in combination with various drive methods.

As mentioned earlier as a nonlimiting example, this process is particularly well suited to filling profiles with extruded thermoplastics. A characteristic of thermoplastics that is used to advantage in this process is that molten thermoplastics only need to be cooled to solidify. Thus high speed, direct, in-line filling and debridging is easily arranged whereas with liquid thermosets two distinct operations, that is pouring and debridging, are the norm. Thus, the directly extruded thermal barrier frame production process not only uses thermal barrier materials typically half the cost of similar thermoset materials but also uses half the manpower for loading and unloading profiles. In-line pouring and debridging is also possible with liquid thermosets by using rapid cure materials. However, rapid cure usually entails additional material expenses as well as additional capital expense for special two component mixing heads and/or in-line storage carrousels to give sufficient setting and partial curing time.

Poured liquid thermoset materials bond to the thermal barrier cavity unless purposely decoupled, as practised in Canadian Pat. No. 1,084,778. This is generally advantageous for structural purposes. However, it results in the following thermal problems: first, as the coefficients of thermal expansion of the plastic and aluminum, steel, etc. are very much different, seasonal exterior temperature swings versus near constant interior temperature result in high stresses that can delaminate the pieces and/or cause moving part interference unless lower strength, elastomer materials, such as polyurethane, are used. Secondly, bonding results in a direct thermal path through the composite profile, that is, there is no minute air gap at the two plastic to aluminum interfaces to increase the thermal resistance. As the directly extruded thermal barrier does not bond to the thermal barrier cavity walls, the thermal resistance is maximum.

Because the directly extruded thermal barrier does not bond to the thermal barrier cavity wall, relative movement of the thermal barrier and aluminum section occurs with low axial shear loads. However, as the thermal barrier is moulded by the thermal barrier cavity, the shear load capability is highly reproducible. In the case of the assembled and roll crimped thermal barrier process, generally higher shear load capability, typically two to five times as high, is achieved but the results are not very reproducible. Window testing has shown that the readily axially shifted characteristic of the directly extruded thermal barrier is advantageous in that when the load causing the shift, for example a high wind load, is removed there is much less tendency to permanent deformation than with either the poured/bonded or assembled and roll crimped thermal barrier profiles.

The readily axially shifted characteristic of the directly extruded thermal barrier process results in higher profile deflection since shear load is not appreciably transferred. If this poses structural problems, several methods of compensation are possible. The simplest method is to increase the section modulus of one or both of the aluminum profile pieces. This can usually be accomplished without increasing profile weight by rearranging the profile shape(s).

A second method is to bond the directly extruded thermal barrier to the thermal barrier cavity. This is accomplished by applying the adhesive to the thermal barrier cavity wall prior to direct extrusion filling. Adhesives such as epoxy and polyurethane give excellent results and they can be formulated to compensate for potential thermal expansion problems. Certain hot melt adhesives also produce useful results whereas cyanoacrylate, anerobic, silicone and contact cement did not produce useful results under the conditions tested.

Figure 14:
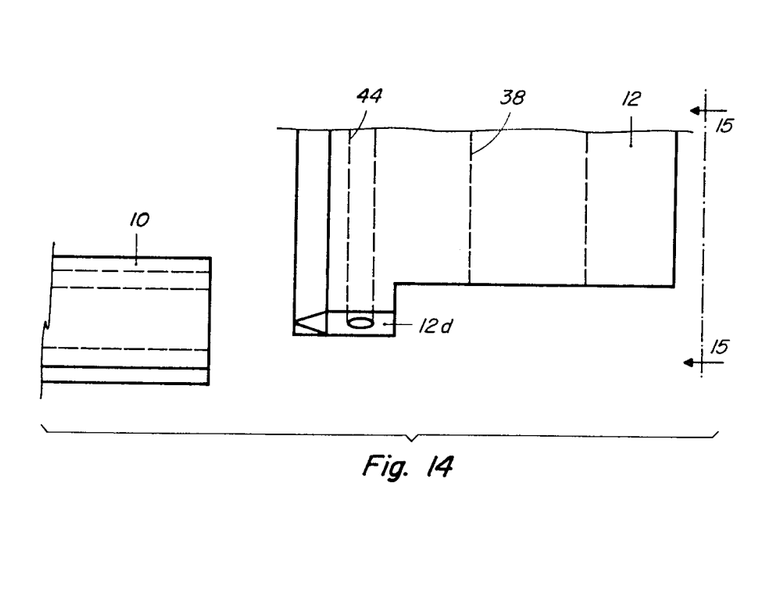
FIGS. 14 and 15 show a dual material, bonding-/direct extrusion filling die.
Figure 15:
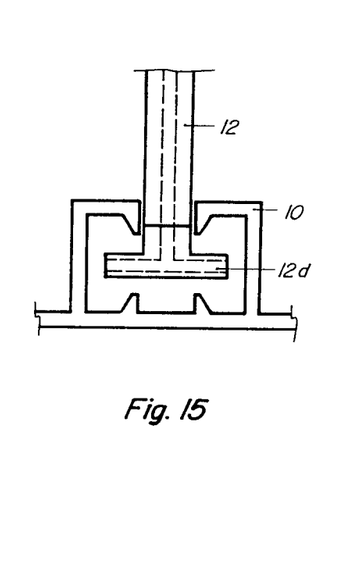

FIGS. 14 and 15 illustrate a dual material filling die having a front portion 12d provided with a fluid flow passage 44 for feeding adhesives to the walls of the cavity ahead of the thermoplastic material fluid flow passage 38. However, separate dies could be used. It could also be possible to use a specially formulated polymer extrusion compound that would adhere to metal, such as the Plexar compounds of the Chemplex Co.

Figure 16:
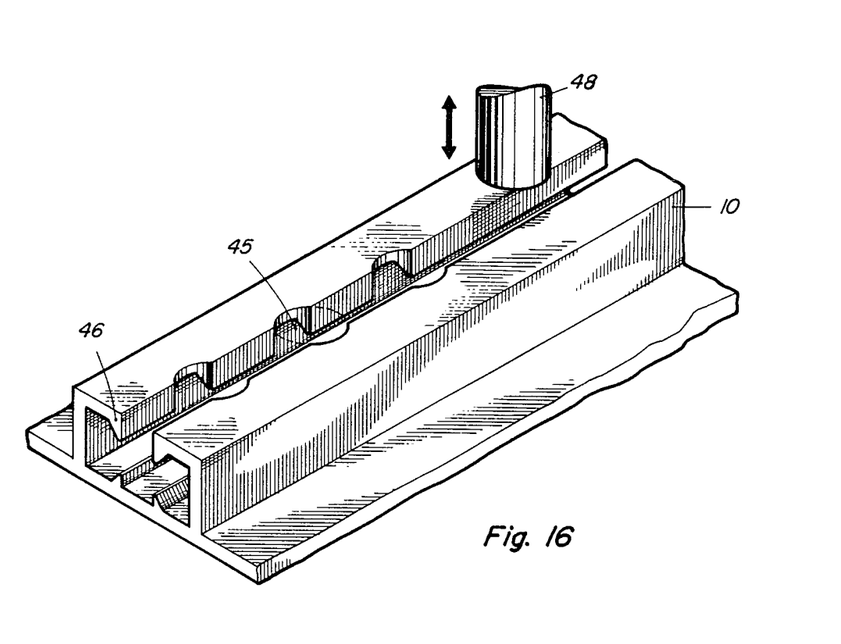
FIGS. 16–19 illustrate profile modifications to prevent relative motion between the directly extruded thermal barrier profile components.
Figure 17:
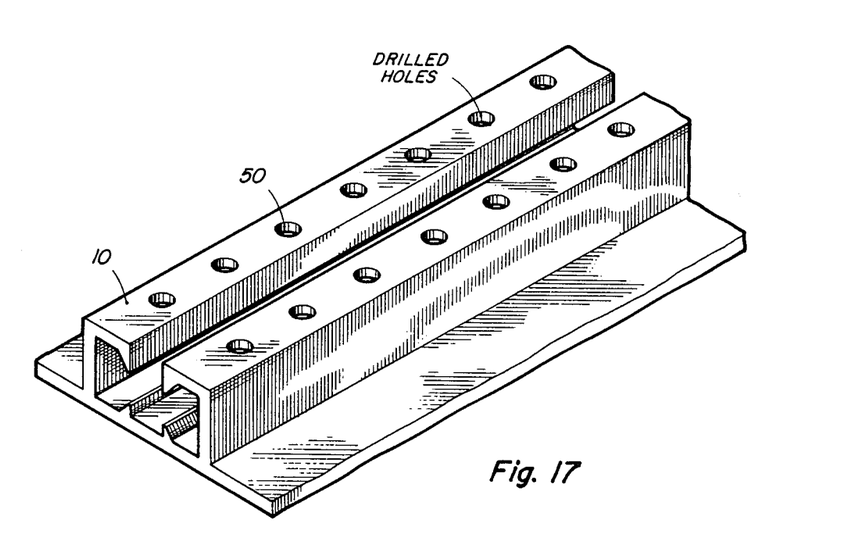
Figure 18:
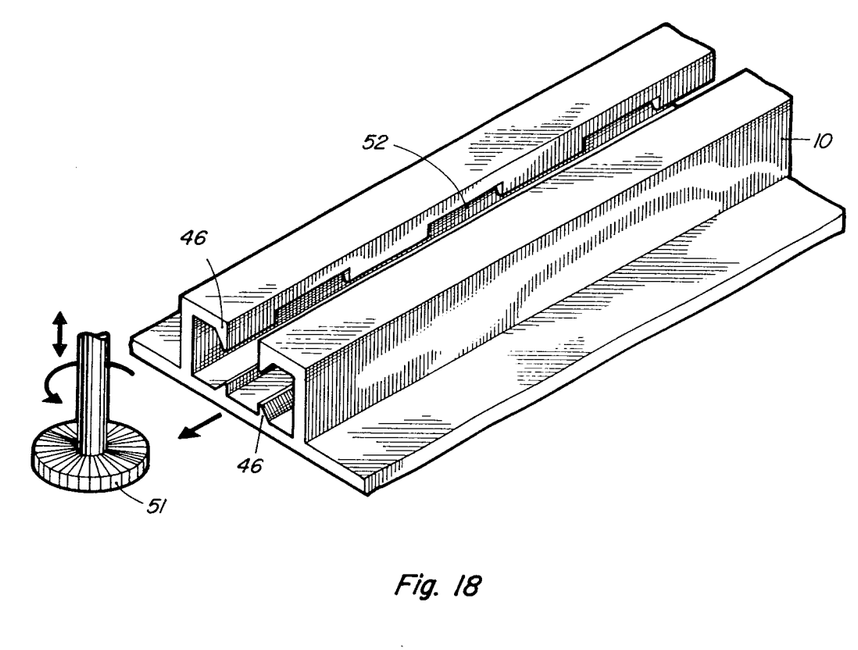

A third method of preventing relative motion between the directly extruded thermal barrier composite profile components is to mechanically modify the thermal barrier cavity, that is to convert it from a basically two dimensional to a three dimensional shape. This can be accomplished by processes such as machining, punching, discontinuous crimping, knurling, etcetera. Machining is not necessarily attractive as material is cut and must be removed, and cutting tools need sharpening and replacement. Nevertheless, FIGS. 16, 17 and 18 illustrate useful profile modifications. FIG. 16 shows indentations 45 done to the bottom and/or top thermal barrier cavity projections 46 using a cutter 48. FIG. 17 shows holes 50 drilled in the top and/or bottom of the thermal barrier cavity wall. This concept is mentioned with respect to liquid thermosets in U.S. Pat. No. 3,823,524. FIG. 18 shows the use of a T-slot cutter 51 to alternately cut indentations 52 in the top and bottom cavity projections 46. This concept is specially attractive since, once filled and debridged, the composite thermal barrier profile looks standard, that is there is no potential cosmetic objections as there would be with the concepts of FIGS. 16 and 17.

Punching of holes, notches, etc. or discontinuous crimping also can result in load transfer across the thermal barrier. A potential disadvantage is that because of the various profile shapes encountered in practice, it becomes difficult to impossible to change the thermal barrier cavity to a three dimensional shape without detrimentally distorting the aluminum profile.

Knurling can be a particularly attractive method of modifying the thermal barrier axial uniformity since little to no cuttings are produced and since there is no cutting, the knurling tool life can be near infinite. Knurling of the thermal barrier cavity top is not feasible as it would distort the light duty aluminum profiles. Knurling of the thermal barrier sides is not too practical because of the small spaces encountered and because there are two sides to do. Testing has shown that the most appropriate place to knurl is the two bottom sections that project into the thermal barrier cavity to lock the two aluminum profile halves. A narrow, large diameter, angled knurling wheel can reach and knurl each such section. Tests have shown that shear loads as high as those for the conventional poured urethane construction can be accomplished with this knurling technique.

Figure 19:
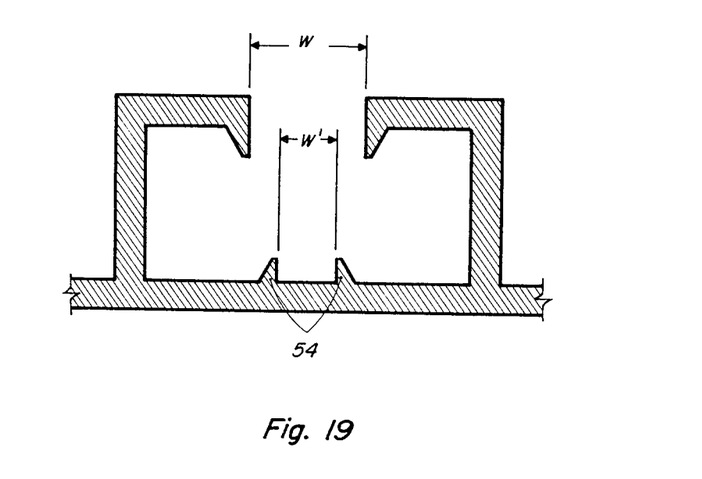

Because of the difficulty in knurling the thermal barrier bottom inside projections with angled wheels, a novel thermal barrier cavity shape was developed such as shown in FIG. 19. The thermal barrier cavity filling slot width "W" is wider than the debridging slot "W'" so that a single, usually large diameter, vertical knurling wheel can readily knurl the two bottom thermal barrier projections 54. This thermal barrier cavity can be used with the novel precision positioning and positive drive system of FIG. 13 by using the knurling wheel as the toothed drive wheel to produce a simple thermal barrier manufacturing system for unbonded or lightly bonded thermal barrier profiles with high shear load transfer capability.

Although the invention has been disclosed with reference to preferred embodiments, it is to be understood that it is not limited to such embodiments but by the scope of the following claims only.

I claim:

1. A process for constructing a thermal barrier profile, said process comprising the steps of:
   (a) providing an elongated structural member having a lineal cavity therein with an open portion;
   (b) driving the elongated member past a filling die while simultaneously guiding the elongated member so as to positively locate the open portion of the lineal cavity with respect to the filling die in order to completely close the cavity and so form a composite mould with the filling die and the cavity at the location of the filling die;
   (c) continuously extruding thermoplastic material under pressure into the composite mould through a fluid flow passage in said filling die; and
   (d) removing a lineal portion of the structural member opposite to the open portion of the lineal cavity to form the thermal barrier profile.

2. A process as defined in claim 1, wherein the width of the filling die is only slightly smaller than the width of the open portion of the lineal cavity to prevent back extrusion flow of the thermoplastic material between the filling die and the cavity wall.

3. A process as defined in claim 1, further comprising the step of imparting structural modifications to the cavity of the structural member to increase axial shear load capability of the thermal barrier profile.

4. A process as defined in claim 3, wherein said structural member includes internal projections and wherein said method for imparting structural modifications to the cavity includes knurling of said projections.

5. An apparatus for constructing a thermal barrier profile from an elongated structural member having a lineal cavity with an open portion, comprising:
   (a) a filling die adapted to be inserted in the open portion of said lineal cavity;
   (b) means for driving the elongated member past the filling die;
   (c) guide means to positively locate the open portion of said lineal cavity with respect to the filling die so as to completely close the cavity and so form a composite mould with the filling die and the cavity at the location of the filling die;
   (d) means for extruding thermoplastic material under pressure into the composite mould through a fluid flow passage in said filling die; and
   (e) means for removing a lineal portion of the structural member opposite the open portion of the lineal cavity to form the thermal barrier profile.

6. An apparatus as defined in claim 5, wherein said means for driving the elongated member is a driven toothed wheel engaging the bottom of the elongated structural member and a pinch roll engaging the top of the elongated structural member, or vice versa.

7. An apparatus as defined in claim 6, wherein said guide means is a pair of rolls engaging opposite sides of the structural member.

8. An apparatus as defined in claim 6, wherein said guide means is a wheel engaging the open portion of the lineal cavity and wherein the width of the wheel is slightly less than the width of the open portion of said cavity.

9. An apparatus as defined in claim 5, wherein said means for driving the elongated member is a driven toothed wheel engaging the interior bottom of the lineal cavity through the open portion of the lineal cavity, and a pinch roll engaging the bottom of the elongated structural member, and wherein the width of said toothed wheel is slightly less than the width of the open portion of said cavity to guide and locate the open portion of the cavity with respect to the filling die.

10. An apparatus as defined in claim 5, wherein said filling die includes an additional die portion ahead of the fluid flow passage to block off the lineal cavity from forward fluid flow.

11. An apparatus as defined in claim 5, wherein said filling die includes a streamlined portion to orient the thermoplastic flow in the same direction as the profile.

12. An apparatus as defined in claim 5, wherein said filling die includes a raised back fin to force the thermoplastic material into the cavity.

13. An apparatus as defined in claim 5, wherein said filling die further comprises an additional fluid flow passage for applying an adhesive to the cavity wall prior to extrusion of the thermoplastic material.

14. A process for constructing a composite thermal barrier profile comprising the steps of:
(a) providing two separate elongated structural members having portions facing and spaced from each other to form a lineal cavity with opposite open portions;
(b) driving the elongated members past a filling die while simultaneously guiding the elongated members so as to positively locate the open portions of the lineal cavity with respect to corresponding portions of the filling die in order to completely close the cavity and so form a composite mould with the filling die and the cavity at the location of the filling die; and
(c) continuously extruding thermoplastic material under pressure into the composite mould through a fluid flow passage in the filling die.

15. A process for constructing a composite thermal barrier profile comprising the steps of:
(a) providing two separate elongated structural members having portions facing and spaced from each other to form a lineal cavity with opposite open portions;
(b) clamping the two separated elongated structural members to a solid spaced member closing one open portion of the cavity;
(c) driving the elongated members past a filling die while simultaneously guiding the elongated members so as to precisely locate the other open portion of the lineal cavity with respect to the filling die in order to completely close the cavity and so form a composite mould with the filling die and the cavity at the location of the filling die; and
(d) continuously extruding thermoplastic material under pressure into the composite mould through a fluid flow passage in the filling die.

16. A process as defined in claim 14, wherein the width of the filling die is only slightly smaller than the width of the open portions of the lineal cavity to prevent back extrusion flow of the thermoplastic material between the filling die and the cavity wall.

17. An apparatus for constructing a thermal barrier profile from two separate elongated structural members having portions facing and spaced from each other to form a cavity having opposite open portions, comprising:
(a) a filling die adapted to be inserted between the two spaced portions of the structural members and having portions adapted to close the open portions of the lineal cavity;
(b) means for driving the elongated members past said filling die;
(c) guide means to positively locate the two open portions of said cavity with respect to the corresponding portions of the filling die so as to completely close the cavity and so form a composite mould with the filling die and the cavity at the location of the filling die; and
(d) means for extruding thermoplastic material under pressure into the composite mould through a fluid flow passage in said filling die.

18. An apparatus as defined in claim 17, wherein said means for driving the elongated members is a driven toothed wheel engaging the bottom of the elongated structural members and a pinch roll engaging the top of the elongated structural members, or vice versa, and wherein said guide means is a pair of rolls engaging opposite sides of the structural members.

19. An apparatus as defined in claim 17, wherein said filling die includes a side slot at the exit end thereof forming said portions adapted to close the cavity and wherein said fluid flow passage leads into said slot.

* * * * *